Patented Oct. 31, 1939

2,178,109

UNITED STATES PATENT OFFICE 2,178,109

METHOD OF ISOLATING FOLLICLE HORMONES FROM THE URINE OF PREGNANT INDIVIDUALS

Erwin Schwenk, New York, N. Y., and Friedrich Hildebrandt, Hohen Neuendorf, near Berlin, Germany, assignors to Schering Aktiengesellschaft, a corporation of Germany No Drawing. Application January 26, 1934, Serial No. 708,428. Renewed December 31, 1937. In Germany January 31, 1933

25 Claims. (Cl. 260—131)

This invention relates to follicle hormones and more particularly to a method of isolating the same from the urine of pregnant individuals and from other animal and from vegetable sources.

It is an object of this invention to provide means whereby the isolation of said hormones from their starting materials is effected in a simpler and more efficient manner than was hitherto possible.

It has been found, that it is possible to isolate follicle hormones from the urine of pregnant individuals or preparations obtained therefrom, for instance, by extraction, by first isolating the esters of the hormones and then saponifying the latter to the free hormones.

For this purpose, it is necessary to produce the esters in a comparatively pure form. This is accomplished by subjecting the urine or extracts obtained therefrom or from other sources, such as placenta and other organs or vegetable matter and the like to a preliminary treatment whereby the volatile phenols and the neutral constituents contained in said starting materials are removed. This preliminary treatment is preferably carried out in the following manner. The urine or the extract therefrom is first subjected to a steam-distillation whereby the volatile phenols and the like are driven off. The residue from the steam-distillation is then either boiled with aqueous alkali hydroxide solutions or dissolved in an organic solvent not miscible with water, which solution is then extracted with alkali metal hydroxide solutions. Both methods effect a separation of the neutral constituents of the starting materials while the hormone remains in the alkaline solution. Said solution contains a very small amount of the hormones together with a relatively large amount of other substances of diverse character, such as inorganic salts, organic compounds of different types, coloring matter and the like. Thereafter the latter is reacted with acylating agents, such as acid chlorides or acid anhydrides or the like, the acylation product is isolated and yields on saponification a highly effective hormone.

Instead of using alkali metal hydroxide solutions also other compounds of alkaline reaction, such as inorganic or organic bases, pyridine and the like, may be used for the treatment of the steam-distilled product. As solvent not miscible with water, ether, benzene or the like may be employed. When using urine as starting material the boiling of the urine with alkali is continued until the ammonia is completely or mostly expelled. The neutral constituents separated on boiling with alkali may be removed from the alkaline solution by centrifuging, filtering, preferably in the presence of kieselguhr or the like, or in any other suitable manner.

The following examples serve to illustrate the invention without, however, limiting the same to them.

Example 1

20 liters of urine of pregnant individuals are steam distilled until no more volatile compounds are driven off. The residue is made alkaline and boiled for several hours until the greater part of the ammonia is expelled whereby the water is partly evaporated and the undissolved matter is removed by filtration. p-Toluolsulfonic acid chloride, preferably dissolved in a little acetone, is added to the concentrated, strongly alkaline solution while stirring, and the stirring is continued for several hours, thereby heating the reaction mixture to about 30–40° C. On cooling the acylation product separates in the form of a smeary and oily precipitate which is filtered off. On saponification a highly effective follicle hormone preparation is obtained.

Example 2

500 grams of an extract obtained in the usual manner from placenta containing about 50,000 mouse units per gram are freed from volatile substances by steam-distillation. The residue is boiled in the presence of some kieselguhr with dilute alkali metal hydroxide solution for several hours and thereafter filtered. 250 grams of benzoyl chloride are added to the alkaline solution, while stirring thoroughly. The follicle hormone benzoate separates in smeary and oily form. It can be filtered by adding some kieselguhr to the solution. But it may also be extracted from the reaction mixture by means of ether. On evaporation the ethereal solution, there remains a partly crystalline residue.

Example 3

100 grams of a follicle hormone extract from pregnant mares, containing about 350,000 mouse units per gram, are steam-distilled for one day. The residue of the steam-distillation, about 80 grams, is dissolved in 1.5 l. of a 5% potassium hydroxide solution and, if necessary, freed from undissolved neutral constituents of the starting material. A solution of about 80 grams of p-toluene sulfonic acid chloride in 160 ccs. of benzene is added to the obtained alkaline solution and the mixture is stirred thoroughly for about 6 to 8 hours. Thereafter the reaction mixture is extracted by means of ether, the ethereal solution is washed with water, dried and the ether is evaporated. The residue is heated for 3 to 4 hours to the boiling point with about 1.5 l. of a 5% methanolic potassium hydroxide solution. The saponification mixture is then diluted with a large quantity of water, sodium chloride is added and again extracted with ether. The ethereal extract is washed successively with water, dilute hydrochloric acid and again water and is several times extracted with 5% aqueous potassium hydroxide solution until on acidifying of a sample of the last alkali extract no precipitation takes place. The alkaline extracts may be combined or worked up separately. On acidifying them, more or less brownish crude crystallizations of the follicle hormone are obtained, which when the crude extract was not steam-distilled sufficiently, may still contain oily constituents. The yield amounts to about 70 to 80% of a crystalline product of the mouse units present in the starting material, said crystalline hormone containing about 3 to 4 millions of mouse units per gram.

Various changes may be made in the details disclosed in the foregoing specification without departing from the invention and from the principles set forth herein and in the claims annexed hereto.

In the claims the term "animal and vegetable sources" is intended to include the urine of pregnant individuals or extracts obtained therefrom or from other sources, such as placenta and other organic or vegetable matter and the like.

What we claim, is:

1. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to a steam distillation whereby the volatile phenols are removed, treating the same with compounds of alkaline reaction whereby the neutral impurities are rendered insoluble, acylating said pretreated material in alkaline solution and saponifying the acylation products obtained thereby.

2. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to a steam distillation whereby the volatile phenols are removed, dissolving the residue from said steam distillation in a solvent non-miscible with water, extracting the same with compounds of alkaline reaction whereby the neutral impurities remain in said solvent, acylating said pretreated material in alkaline solution and saponifying the acylation products obtained thereby.

3. A method of isolating follicle hormones from crude solutions containing small amounts of follicle hormones together with a relatively large amount of other substances of diverse character which normally accompany the hormones in such crude solutions, said solutions not having been treated by chemical means to obtain more concentrated solutions of said hormones or to isolate the same in more or less purified state, which comprises subjecting said starting material to a steam distillation whereby the volatile phenols are removed, treating the same with compounds of alkaline reaction whereby the neutral impurities are rendered insoluble, acylating said preheated material in alkaline solution and saponifying the acylation products obtained thereby, extracting the saponified follicle hormone from said saponification mixture by means of solvents non-miscible with water, purifying the resulting solution and acidifying the same whereby the follicle hormone is isolated.

4. A method of isolating follicle hormones from crude solutions which comprises providing a solution containing said hormones together with a relatively large amount of other substances of diverse character which normally accompany the hormones in such crude solutions, said solutions not having been treated by chemical means to obtain more concentrated solutions of said hormones or to isolate the same in more or less purified state, treating the same with compounds of alkaline reaction whereby neutral impurities are rendered insoluble, and acylating said solution.

5. A method of isolating follicle hormones from crude solutions which comprises providing a solution containing said hormones together with a relatively large amount of other substances of diverse character which normally accompany the hormones in such crude solutions, said solutions not having been treated by chemical means to obtain more concentrated solutions of said hormones or to isolate the same in more or less purified state, treating the same with compounds of alkaline reaction whereby neutral impurities are rendered insoluble, acylating said solution and saponifying the acylation product.

6. A method of isolating follicle hormones from crude solutions which comprises providing a solution containing said hormones together with a relatively large amount of other substances of diverse character which normally accompany the hormones in such crude solutions, said solutions not having been treated by chemical means to obtain more concentrated solutions of said hormones or to isolate the same in more or less purified state, treating the same with compounds of alkaline reaction whereby neutral impurities are rendered insoluble, acylating said solution with a compound taken from the class consisting of organic acid halides and anhydrides, and saponifying the acylation product.

7. A method of isolating follicle hormones from crude solutions which comprises providing a solution containing said hormones together with a relatively large amount of other substances of diverse character which normally accompany the hormones in such crude solutions, said solutions not having been treated by chemical means to obtain more concentrated solutions of said hormones or to isolate the same in more or less purified state, treating the same with compounds of alkaline reaction whereby neutral impurities are rendered insoluble, acylating said solution with a compound taken from the class consisting of toluene sulfonic acid chloride and benzoyl chloride and saponifying the acylation product.

8. A method of isolating follicle hormones from crude solutions which comprises providing a solution containing said hormones, together with a relatively large amount of other substances of diverse character which normally accompany the hormones in such crude solutions, said solutions not having been treated by chemical means to obtain more concentrated solutions of said hormones or to isolate the same in more or less purified state, treating the same with compounds of alkaline reaction taken from the class consisting of inorganic and organic bases whereby neutral impurities are rendered insoluble, and acylating said solution.

9. A method of isolating follicle hormones from crude solutions which comprises providing a solution containing said hormones together with a relatively large amount of other substance of diverse character which normally accompany the hormones in such crude solutions, said solutions not having been treated by chemical means to obtain more concentrated solutions of said hormones or to isolate the same in more or less purified state, subjecting said solution to steam distillation in the presence of a substance having a large surface, treating the same with compounds of alkaline reaction whereby neutral impurities are rendered insoluble, and acylating said solution.

10. A method of isolating follicle hormones from crude solutions which comprises providing a solution containing said hormones together with a relatively large amount of other substances of diverse character which normally accompany the hormones in such crude solutions, said solutions not having been treated by chemical means to obtain more concentrated solutions of said hormones or to isolate the same in more or less purified state, subjecting said solution to steam distillation in the presence of kieselguhr, treating the same with compounds of alkaline reaction whereby neutral impurities are rendered insoluble, and acylating said solution.

11. A method of isolating follicle hormones which comprises providing a crude solution containing a very small amount of follicle hormones together with a relatively large amount of other substances of diverse character which normally accompany the hormones in such crude solutions, said solutions not having been treated by chemical means to obtain more concentrated solutions of said hormones or to isolate the same in more or less purified state, removing volatile phenolic bodies therefrom, treating the remaining material with an acylating agent to cause the same to form acylation products of said hormones, and separating said products from the mass.

12. A method of isolating follicle hormones which comprises providing a crude solution containing a very small amount of follicle hormones together with a relatively large amount of other substances of diverse character which normally accompany the hormones in such crude solutions, said solutions not having been treated by chemical means to obtain more concentrated solutions of said hormones or to isolate the same in more or less purified state, removing volatile phenolic bodies therefrom, adding alkaline substances to the remaining material, treating the remaining material with an acylating agent to cause the same to form acylation products of said hormones, and separating said products from the mass.

13. A method of isolating follicle hormones which comprises providing a crude solution containing a very small amount of follicle hormones together with a relatively large amount of other substances of diverse character which normally accompany the hormones in such crude solutions, said solutions not having been treated by chemical means to obtain more concentrated solutions of said hormones or to isolate the same in more or less purified state, removing volatile phenolic bodies therefrom, treating the remaining material with an acylating agent to cause the same to form acylation products of said hormones, and separating said products from the mass and saponifying the acylation product to give the hormones.

14. A method of isolating follicle hormones which comprises providing a crude solution containing a very small amount of follicle hormones together with a relatively large amount of other substances of diverse character which normally accompany the hormones in such crude solutions, said solutions not having been treated by chemical means to obtain more concentrated solutions of said hormones or to isolate the same in more or less purified state, removing volatile phenolic bodies therefrom by distillation, treating the remaining material with an acylating agent to cause the same to form acylation products of said hormones, and separating said products from the mass.

15. A method of purifying crude extracts containing follicle hormones having at least one hydroxyl group in the molecule and of isolating such hormones therefrom, comprising treating said extracts with acylating agents, separating the esterified from the non-esterified products by physical methods, saponifying the purified esters of the follicle hormones obtained and isolating the follicle hormones.

16. A method of purifying crude extracts containing follicle hormones having at least one hydroxyl group in the molecule and of isolating such hormones therefrom, comprising treating said extracts with acylating agents in the presence of indifferent solvents, separating the esterified from the non-esterified products by physical methods, saponifying the purified esters of the follicle hormones obtained and isolating the follicle hormones.

17. A method of purifying crude extracts containing follicle hormones having at least one hydroxyl group in the molecule and of isolating such hormones therefrom, comprising freeing said extracts from most of their water content, dissolving the remaining extract in indifferent solvents, treating the solution obtained with acid chlorides in the presence of products capable of combining with hydrochloric acid, separating the esterified from the non-esterified products by physical methods, saponifying the purified esters of the follicle hormones obtained and isolating the follicle hormones.

18. A method of purifying crude extracts containing follicle hormones having at least one hydroxyl group in the molecule and of isolating such hormones therefrom, comprising subjecting said extracts to a preliminary purification process, treating said extracts with acylating agents, separating the esterified from the non-esterified products by physical methods, saponifying the purified esters of the follicle hormones obtained and isolating the follicle hormones.

19. A method of purifying crude extracts containing follicle hormones having at least one hydroxyl group in the molecule, comprising treating said extracts with toluene sulfonic acid chloride in the presence of a compound capable of combining with the liberated hydrochloric acid, separating the esterified from the non-esterified products, saponifying the purified esters of the follicle hormones so obtained, and isolating the follicle hormones.

20. A method of purifying crude extracts containing follicle hormones having at least one hydroxy group in the molecule, comprising treating said extracts with toluene sulfonic acid chloride in the presence of pyridine, separating the esterified from the non-esterified products, saponifying the purified esters of the follicle hormones so obtained, and isolating the follicle hormones.

21. A method of purifying crude extracts containing follicle hormones having at least one hydroxy group in the molecule, comprising treating said extracts with an acylating agent, separating the esterified from the unesterified products, saponifying the purified esters of the follicle hormones so obtained and isolating the follicle hormones.

22. The acylation products of follicle hormones with halides of aromatic acids.

23. The acylation products of follicle hormones with halides of aromatic sulphonic acids.

24. The acylation products of follicle hormones with toluene sulphonic acid chloride.

25. The toluene sulphonic acid esters of follicle hormones.

ERWIN SCHWENK.
FRIEDRICH HILDEBRANDT.